US007782781B2

(12) United States Patent
Ha et al.

(10) Patent No.: US 7,782,781 B2
(45) Date of Patent: *Aug. 24, 2010

(54) HOME NETWORK SYSTEM (75) Inventors: Sam-Chul Ha, Changwon-shi (KR); Seung-Myun Baek, Changwon-shi (KR); Koon-Seok Lee, Changwon-shi (KR); Yong-Tae Kim, Gimhae-shi (KR)

(73) Assignee: LG Electronics Inc., Seoul (KR)

( * ) Notice: Subject to any disclaimer, the term of this patent is extended or adjusted under 35 U.S.C. 154(b) by 636 days.

This patent is subject to a terminal disclaimer.

(21) Appl. No.: 11/547,361

(22) PCT Filed: Mar. 31, 2005

(86) PCT No.: PCT/KR2005/000948

§ 371 (c)(1),
(2), (4) Date: Sep. 26, 2007

(87) PCT Pub. No.: WO2005/094193

PCT Pub. Date: Oct. 13, 2005

(65) Prior Publication Data

US 2008/0164980 A1    Jul. 10, 2008

(30) Foreign Application Priority Data

Mar. 31, 2004   (KR) .................... 10-2004-0022206

(51) Int. Cl.
*G01R 31/08*   (2006.01)
*H04J 3/00*    (2006.01)

(52) U.S. Cl. .................... 370/235; 370/470; 370/472

(58) Field of Classification Search .................. 370/229, 370/230, 230.1, 235, 236, 465, 470, 472, 370/401; 709/208; 700/3, 90
See application file for complete search history.

(56) References Cited

U.S. PATENT DOCUMENTS 6,002,669 A * 12/1999 White .................... 370/235
2009/0022151 A1* 1/2009 Jeon et al. .................... 370/389

OTHER PUBLICATIONS

Jae-Min Lee, et al., "Home Network Control Protocol for Networked Home Appliances and its Application," Seoul National University Domestic Journals vol. 1, No. 1, pp. 26-39, 2002.
Koon-Seok Lee, et al., "A New Control Protocol for Home Appliances—LnCP," In: IEEE International Symposium on Industrial Electronics, 2001, Proceedings, ISIE 2001, Jun. 12-16, 2001, Piscataway, NJ, USA, IEEE, pp. 286-291.

* cited by examiner

*Primary Examiner*—Ian N Moore
(74) *Attorney, Agent, or Firm*—McKenna Long & Aldridge LLP (57) ABSTRACT

A home network system using a living network control protocol. The home network system includes: at least two electric devices (e.g., a first and a second electric device); and a network based on a predetermined network for networking the electric devices, wherein the first electric device sends a request message to the second electric device, and the second electric device sends a response message to the first electric device, wherein the response message transmitted from a lower layer to an upper layer of the second electric device is transmitted to a lower layer and then to an upper layer of the first electric device, and includes a command code included in the request message, for indicating an operation for the second electric device to execute, and a field related to an execution of the request.

2 Claims, 7 Drawing Sheets

| CC | AUG1 | AUG2 | ...... |

FIG.12

| CC | TOTALPAGE | CURRENTPAGE | ...... |

FIG.13

| CC | PAGENO | DATANO | ...... |

FIG. 14

| CC | ACK | AUG1 | AUG2 | ...... |

FIG. 15

| CC | NAK | NAK_CODE |

FIG. 16

| CC | NAK | NAK_CODE | ERROR_CODE |

FIG. 17

HOME NETWORK SYSTEM

TECHNICAL FIELD

The present invention relates to a home network system, and more particularly to, a home network system using a living network control protocol.

BACKGROUND ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
|---|---|---|
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system. Also, a network protocol in the conventional art home network system does not suggest an effective method for receiving and transmitting a packet.

DISCLOSURE OF THE INVENTION

The present invention is achieved to solve the above problems. An object of the present invention is to provide a home network system using a control protocol which is a general communication standard for providing functions of controlling and monitoring electric devices in the home network system.

Another object of the present invention is to provide a home network system using a living network control protocol (LnCP) as a general communication standard.

Still another object of the present invention is to provide a home network system performing communication through a response message, on the basis of the LnCP.

Yet another object of the present invention is to provide a home network system performing communication through a response message having an error code related to the operation of a product.

In order to achieve the above-described objects of the invention, there is provided a home network system including: at least two electric devices (referred to as a first and a second electric device); and a network based on a predetermined network for networking the electric devices, wherein the first electric device sends a request message to the second electric device, and the second electric device sends a response message to the first electric device, wherein the response message transmitted from a lower layer to an upper layer of the second electric device is transmitted to a lower layer and then to an upper layer of the first electric device, and includes a command code included in the request message, for indicating an operation for the second electric device to execute and a field related to an execution of the request.

BEST MODE FOR CARRYING OUT THE INVENTION

A home network system in accordance with the present invention will now be described in detail with reference to the accompanying drawings.

Figure 1:
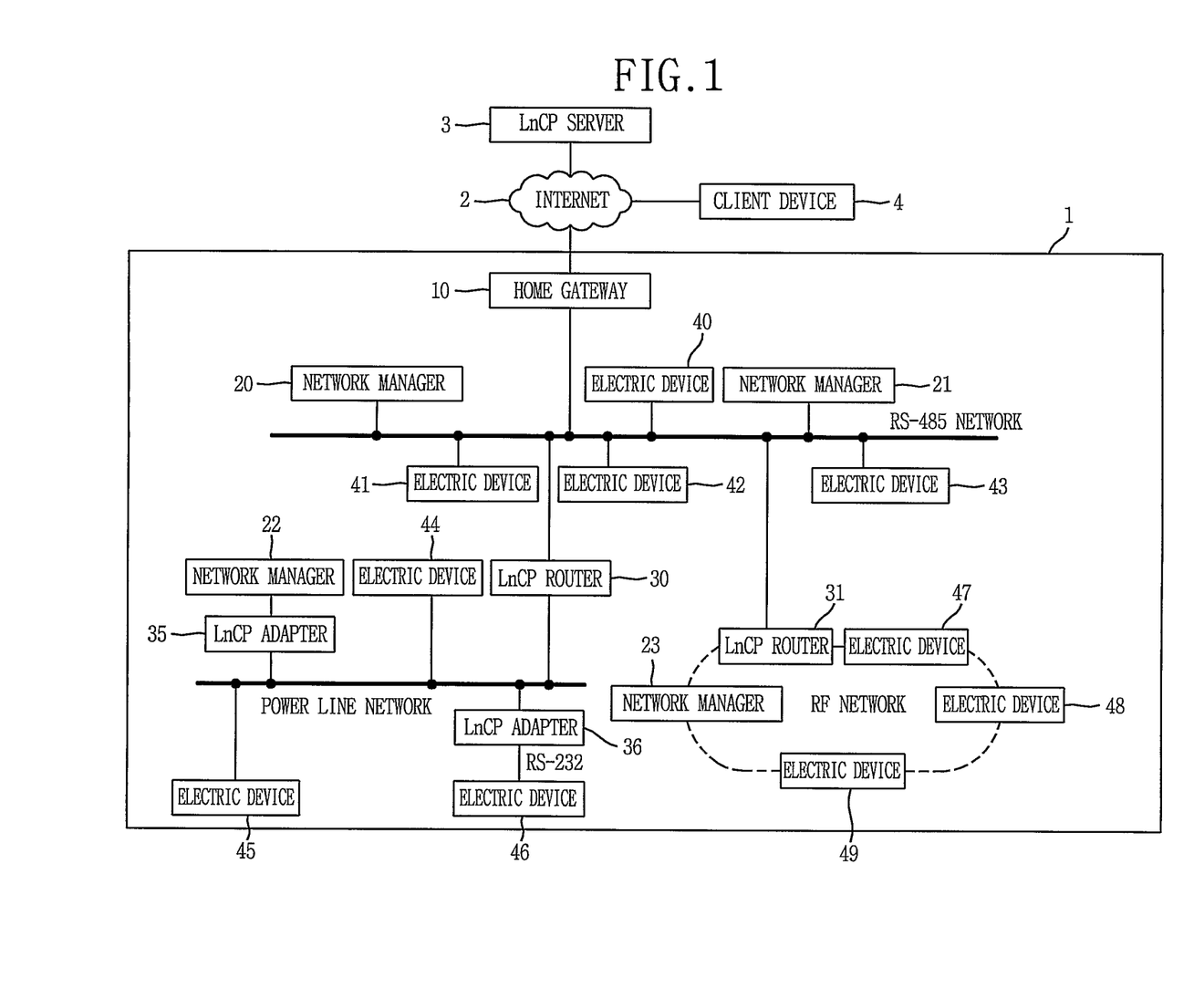
FIG. 1 is a structure view illustrating a home network system in accordance with the present invention.

FIG. 1 is a structure view illustrating the home network system in accordance with the present invention.

Referring to FIG. 1, the home network system 1 accesses an LnCP server 3 through an internet 2, and a client device 4 accesses the LnCP server 3 through the internet 2. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of predetermined types of messages. In addition, the LnCP server 3 receives a predetermined type of message from the home network system 1, and stores the message and/or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS-485 or small output RF, or a standardized transmission medium such as a power line and IEEE 802.11 as the transmission medium.

The network of the home network system 1 is separated from the internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and notifying their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS-485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 20 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a cluster code.

Figure 2:
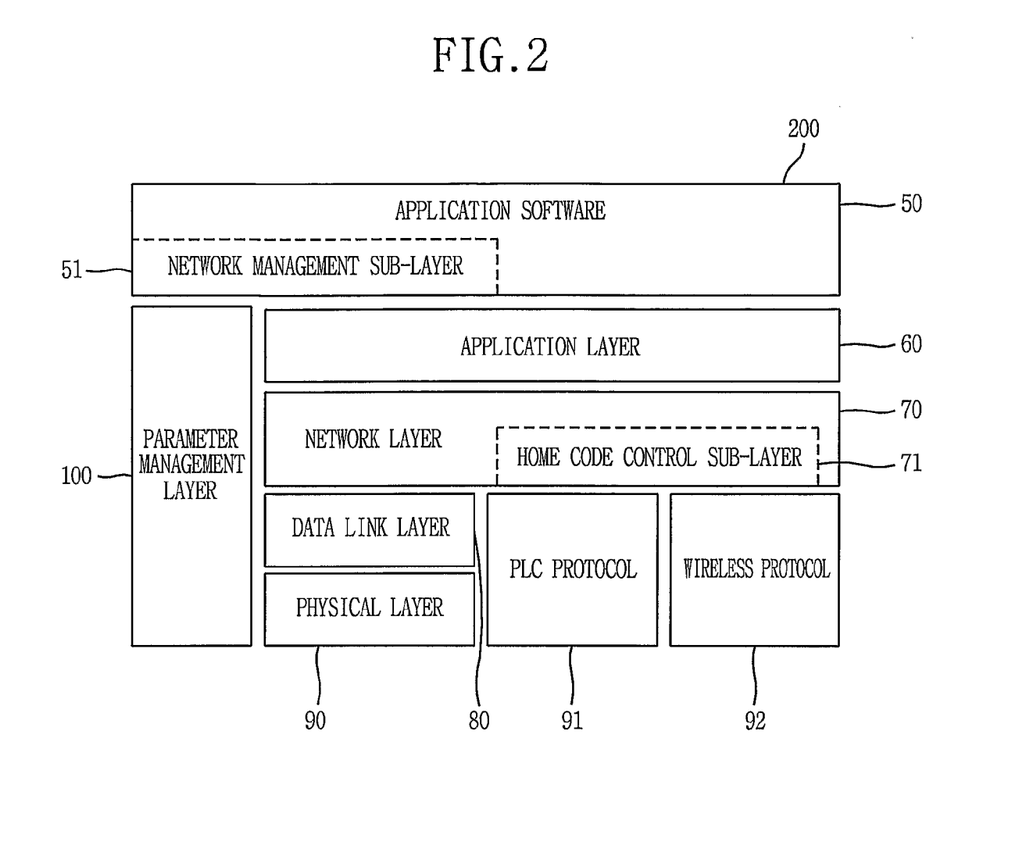
FIG. 2 is a structure view illustrating a living network control protocol stack in accordance with the present invention.

FIG. 2 is a structure view illustrating a living network control protocol stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sub-layer 71 for performing a function of setting, managing and processing home codes for logically dividing each individual network. When the individual networks are physically divided by an independent transmission medium such as RS-485, the home code control sub-layer 71 is not included in the LnCP. Each of the home codes is comprised of 4 bytes, and set as random values or designated values of the user.

Figure 3:
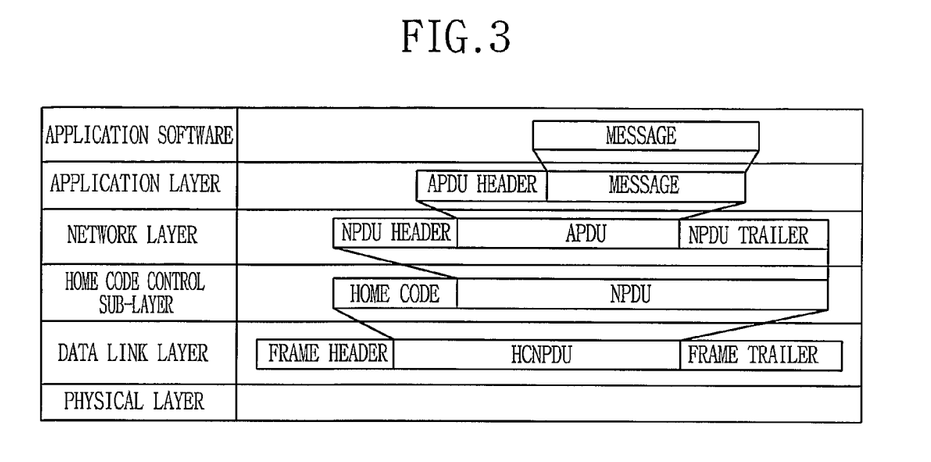
FIGS. 3 and 4 are structure views illustrating interfaces between layers of FIG. 2, respectively.
Figure 4:
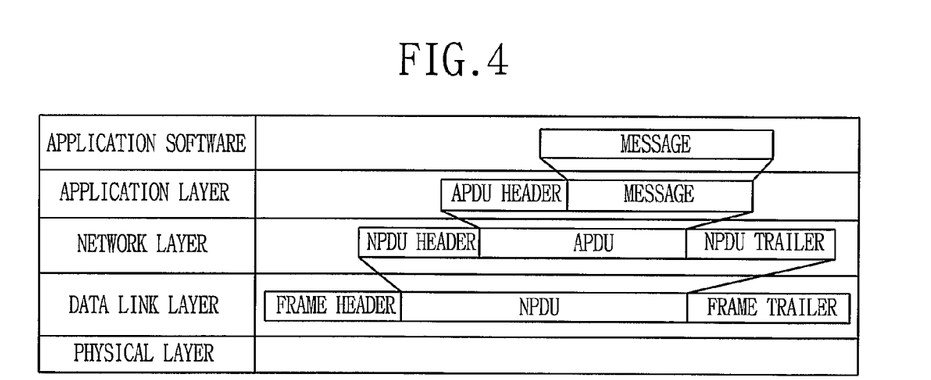

FIGS. 3 and 4 are structure views illustrating interfaces between the layers of FIG. 2, respectively.

FIG. 3 illustrates the interfaces between the layers when the physical layer 90 is connected to the non-independent transmission medium, and FIG. 4 illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3 and 4, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 5 to 10 are detailed structure views illustrating the interfaces of FIGS. 3 and 4, respectively.

Figure 5:
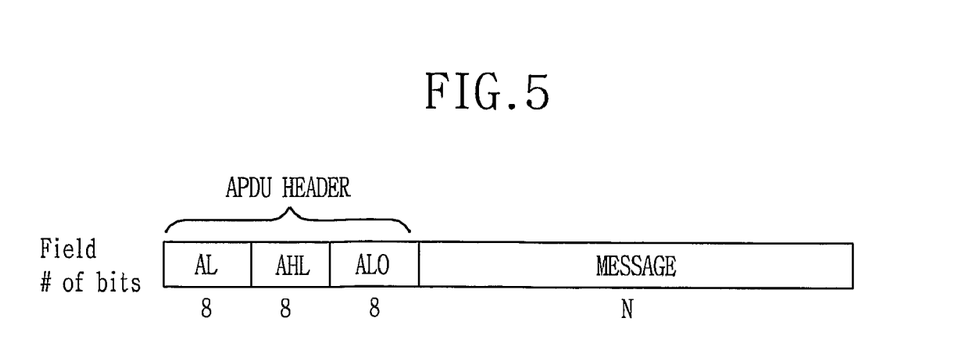
FIGS. 5 to 10 are detailed structure views illustrating the interfaces of FIGS. 3 and 4, respectively.

FIG. 5 illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to ALO), normally has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

Figure 6:
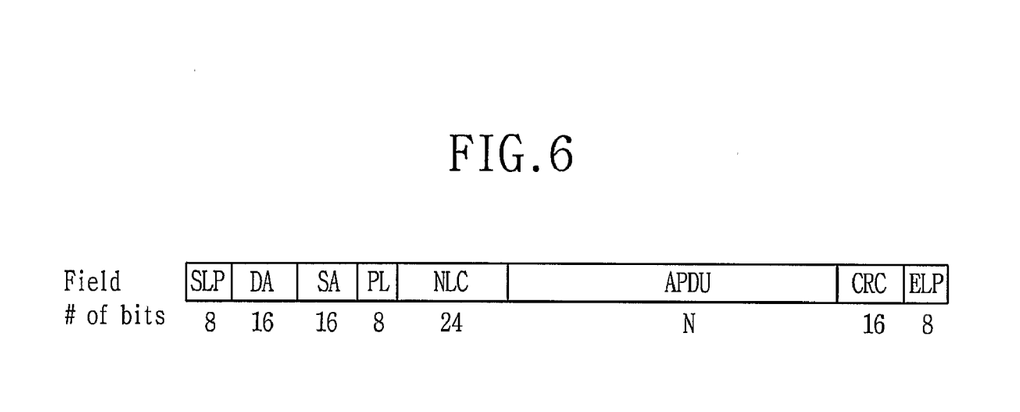
Figure 7:
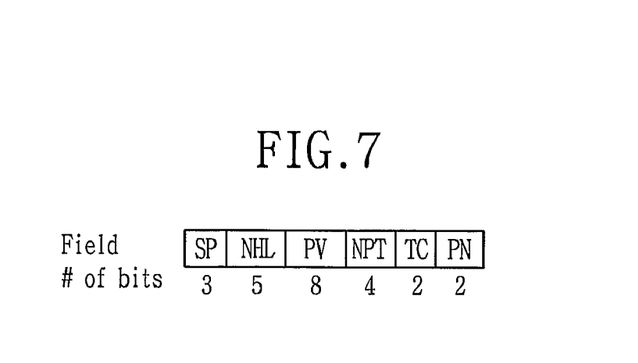

FIG. 6 illustrates the NPDU structure in the network layer 70, and FIG. 7 illustrates a detailed NLC structure of the NPDU.

A start of LnCP packet (SLP) field indicates start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind. A packet length (PL) field shows the total length of NPDU which will be transferred, and its initial length is 15 bytes and its maximum length is 120 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Message type |
| --- | --- | --- |
| High | 0 | Security related message |
| Middle | 1 | When a normal packet is transmitted |
|  |  | When an event message for online or offline status change is transmitted |
| Normal | 2 | When a notification message for composing a network is transmitted |
|  |  | When a normal event message is transmitted |

TABLE 2-continued

| Priority | Value | Message type |
| --- | --- | --- |
| Low | 3 | When a data is transmitted by download or upload mechanism |

An NPDU header length (NHL) field extends an NPDU header (NLC field of SLP), normally has 9 bytes, and is extended to a maximum of 17 bytes.

A protocol version (PV) field indicates the employed protocol version and its length is 1 byte. The upper 4 bits show the version, and the lower 4 bits show the sub-version. Version and sub-version use HEX to show their values respectively.

A network layer packet type (NPT) field is a 4-bit field for distinguishing a kind of a packet in the network layer 70. The LnCP includes a request packet, a response packet and a notification packet. The NPT field of a master device must be set as the request packet or the notification packet, and the NPT field of a slave device must be set as the response packet or the notification packet. Table 3 shows NPT values by kinds of packets.

TABLE 3

| Explanation | Value |
| --- | --- |
| Request packet | 0 |
| reserved | 1~3 |
| Response packet | 4 |
| reserved | 5~7 |
| Notification packet | 8 |
| reserved | 9~12 |
| Reserved value for interface with the home code control sub-layer | 13~15 |

A transmission counter (TC) field is a 2 bit field which retransmits the request packet or repeatedly transfers notification packet in order to enhance the transmission success rate of the notification packet when a communication error occurs in the network layer 70, making it unable to transfer the request packet or response packet properly. Table 4 shows the range of the values of the TC field by the NPT values.

TABLE 4

| Kind of packet | Value (range) |
| --- | --- |
| Request packet | 1~3 |
| Response packet | 1 |
| Notification packet | 1~3 |

A packet number (PN) field consists of 2 bytes, and it is used with the TC to detect duplicated packets in the slave device, and it is used to deal with multiple communication cycles in the master device. Table 5 shows the range of the values of the PN field by the NPT values.

TABLE 5

| Kind of packet | Value (range) |
| --- | --- |
| Request packet | 0~3 |
| Response packet | Copy a PN field value of a request packet |
| Notification packet | 0~3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field is the end of the packet with the value 0x03. If the ELP field is not detected in spite of byte length of the received data is the same with the value of packet's length field, this packet will be considered as an error packet.

Figure 8:
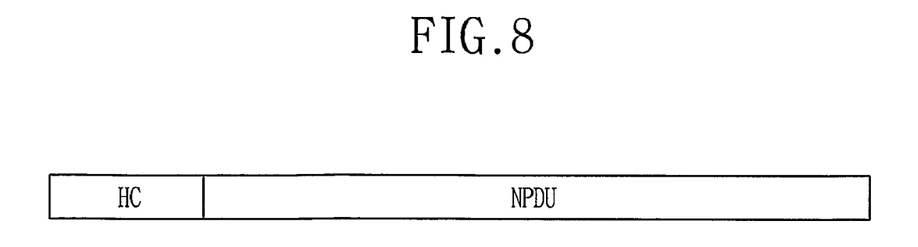

FIG. 8 illustrates the HCNPDU structure in the home code control sub-layer 71.

As depicted in FIG. 8, a home code (HC) field is added to the upper portion of the NPDU.

The home code is comprised of 4 bytes, and has a unique value within the line distance where a packet can be transmitted.

Figure 9:
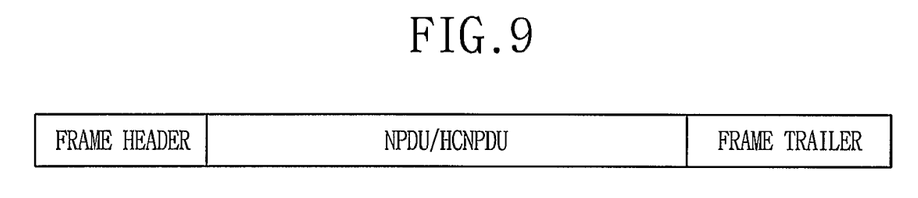

FIG. 9 illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE 802.11. The data link layer 80 processes the NPDU and the HCNPDU in the same manner.

Figure 10:
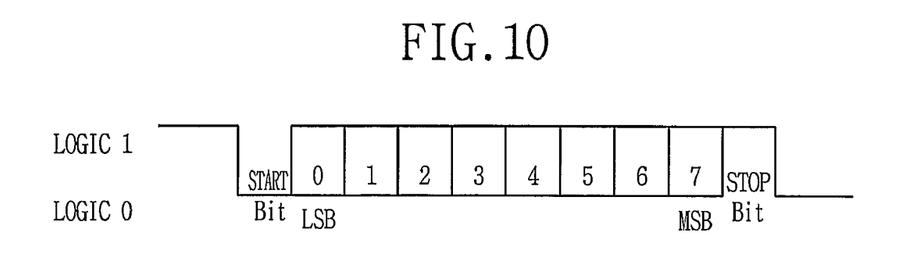

FIG. 10 illustrates a frame structure in the physical layer 90.

The physical layer 90 of the LnCP handles a function of transmitting and receiving a physical signal to a transmission medium. The data link layer 80 can use a non-standardized transmission medium such as RS485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 10, and transmitted through the transmission medium. The UART frame includes one bit of start bit, 8 bits of data and one bit of stop bit without any parity bit. The start bit is transmitted first, followed by data bits and the stop bit. When the home network system 1 using the LnCP employs the UART, it does not have additional frame header and frame trailer.

According to a byte (or bit) data layout on the aforementioned message, an upper byte (or bit) data is located on the left side of the message, and a lower byte data is located on the right side of the message. The application layers 60 and 60a deal with the following messages.

Request Message: This is a message transmitted from the application layer 60 to the network layer 70 of a master device, or from the network layer 70a to the application layer 60a of a slave device, to execute a command in a slave device. The application layer 60a of the slave device may send a response message according to the transmission mode from the network layer 70a of the slave device;

Response Message: This is a response to the request message, which is transmitted from the network layer to the application layer 60 of a master device, or from the application layer 60a to the network layer 70a of a slave device, indicating a result of command execution in the slave device; and Event Message: When the status of a device is changed, this message is transmitted from an application layer to a network layer on a sended side, or from a network layer to an application layer on a receiving side. As a rule, the receiving side does not respond to the event message.

Figure 11:
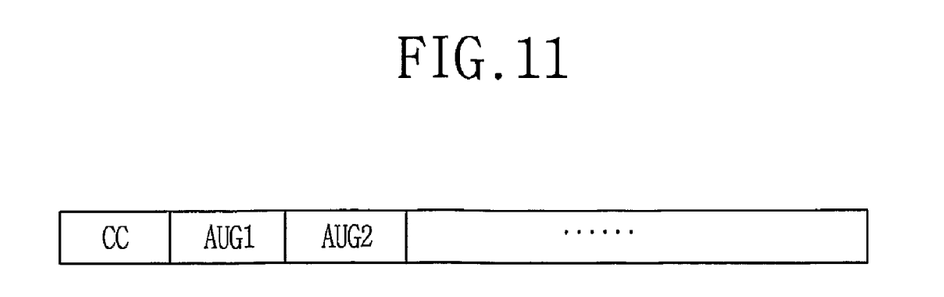
FIGS. 11 to 13 are structure views illustrating request messages, respectively.
Figure 12:
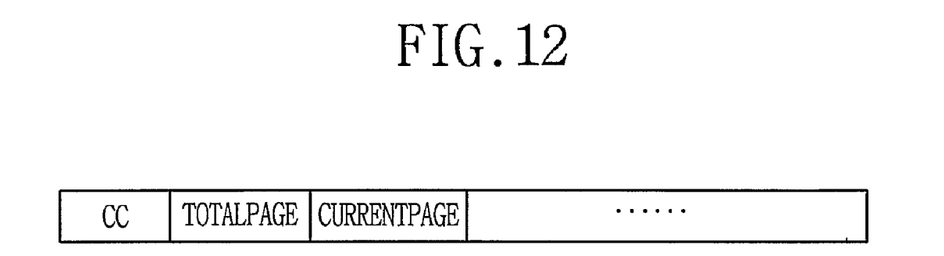
Figure 13:
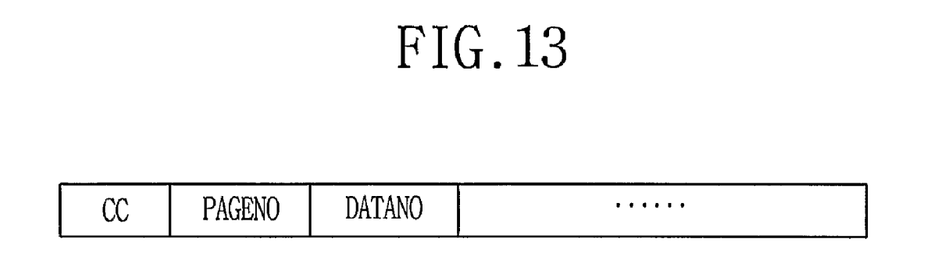

FIGS. 11 to 13 are structure views illustrating request messages, respectively.

For example, FIG. 11 illustrates the basic format of a request message. The request message is composed of a command code CC, and related arguments (arg1, arg2, . . . ), and used for requesting device control and checking status and information of a device.

FIG. 12 illustrates a downloading request message including a TotalPage and a CurrentPage as input arguments for splitting and transmitting data to a device.

FIG. 13 illustrates an uploading request message including a PageNo and a DataNo as input arguments for splitting and acquiring data from a device.

In detail, the downloading request message is usually sent when a master device intends to retain predetermined data and transmit the data to a slave device and/or another master device. The data is partitioned or splitted into smaller data of a predetermined size, and the total number of the partitioned data makes up a total page, and a page included in a current request message makes up a current page.

The uploading request message is usually sent when a slave device and/or another master device intend(s) to retain and upload predetermined data. A master device requests part of the data corresponding to the data number, and this partial data later makes up partitioned data in the sequence corresponding to a page number.

Figure 14:
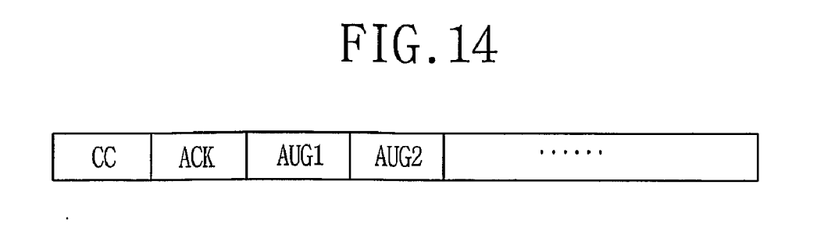
FIGS. 14 to 16 are structure views illustrating response messages, respectively.
Figure 15:
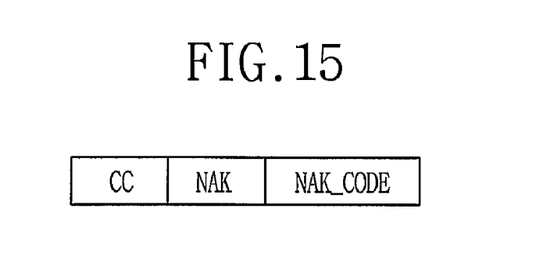
Figure 16:
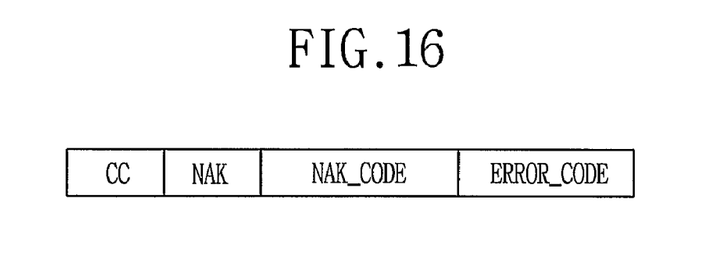

FIGS. 14 to 16 are structure views illustrating response messages, respectively.

Generally, there are two main types of response messages: ACK-response messages generated when a request from a master device is executed successfully, and NAK-response messages generated when a request from a master device is not executed.

FIG. 14 illustrates an ACK-response message. The ACK-response message consists of a command code, an ACK (for example, 0x06), and arguments (arg1, arg2, . . . ) indicating the result of a request execution. As aforementioned, the ACK-response message is transmitted when a slave device has executed a request from a master device successfully.

FIG. 15 illustrates an NAK-response message. The NAK-response message consists of a command code, a NAK (for example, 0x15), and a one-byte NAK_code. As aforementioned, the NAK-response message is transmitted when a request from a master device has not been executed successfully by a slave device. Here, the NAK_code is a code value that is classified specifically for a reason or a cause describing that the slave device has failed to execute the request message due to an incorrect command code or argument during the communication process between the master device and the slave device. Therefore, the NAK_code is and must be distinguished from an error related to a product operation.

FIG. 16 illustrates a NAK-response message including an Error_code. The Error_code is an error that is related to the operation of a product. If the slave device has failed to execute the request message because of this type of error, a NAK_code value is fixed to a predetermined value such as '0x63', and an Error_code value comes after the NAK_code.

Figure 17:
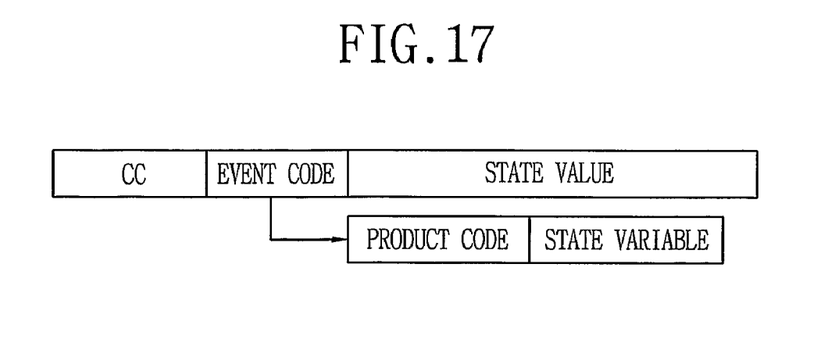
FIG. 17 is a structure view illustrating an event message.

FIG. 17 is a structure view illustrating an event message.

As depicted in FIG. 17, the event message is generated when a status change occurs in a device. The event message consists of a command code (for example, 0x11), an event code of 2 bytes, and a state value of 4 bytes. In the event code, an upper one byte indicates a product code, and a lower one byte indicates a state variable.

As explained before, the home network system using a control protocol which is a general communication standard provides functions of controlling and monitoring electric devices in the home network system.

In addition, the home network system of the present invention uses a living network control protocol (LnCP) as a general communication standard.

Also, the home network system of the present invention performs communication through a response message based on the LnCP, in which the response message further includes an error code related to product operation.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A network device for communicating with other network device through a network,
   wherein the network device stores a response message corresponding to a request message from the other network device,
   wherein the response message comprises a command code for indicating an operation for the network device to execute, and a field related to an execution of the request,
   wherein the field comprises a NAK field indicating that the request is not executed successfully, and a NAK code field being used for indicating a reason of the execution failure during the communication process between the network device and the other network device,
   wherein the NAK code field indicates at least one of a command code error, an argument error and a network device operation error,
   wherein a predetermined fixed value is assigned to the NAK code field for indicating the network device operation error, and
   wherein when the NAK code field indicates the network device operation error by the predetermined fixed value, the field further comprises an error code field being used for indicating a reason of the execution failure caused by an operation error of the network device.

2. The network device of claim 1, wherein each of the NAK code field and the NAK field is one byte length.

* * * * *